(No Model.) 2 Sheets—Sheet 1.
J. F. SEIBERLING.
HARVESTER AND BINDER.
No. 429,652. Patented June 10, 1890.
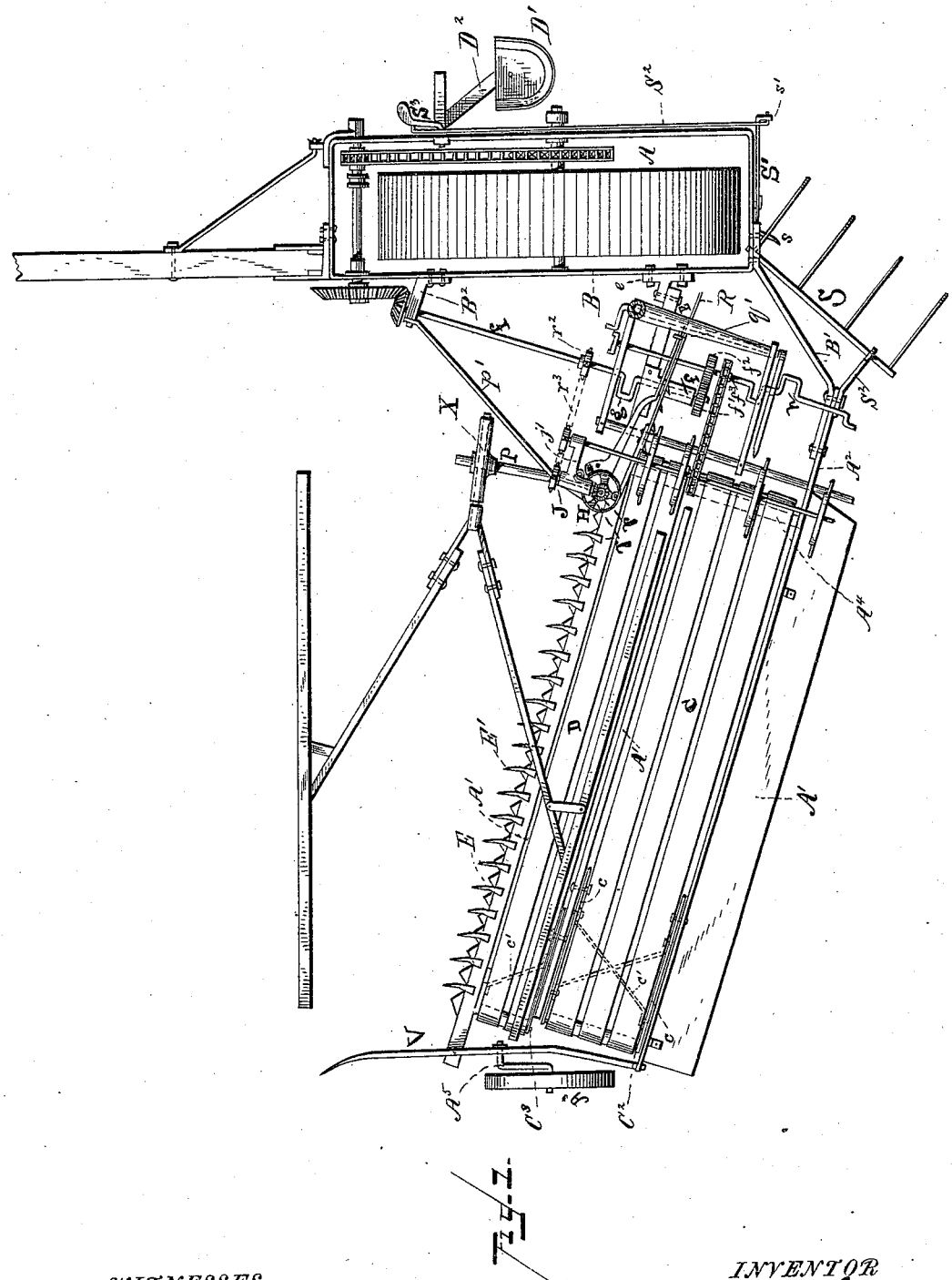
WITNESSES
INVENTOR (No Model.) 2 Sheets—Sheet 2.
J. F. SEIBERLING.
HARVESTER AND BINDER.
No. 429,652. Patented June 10, 1890.
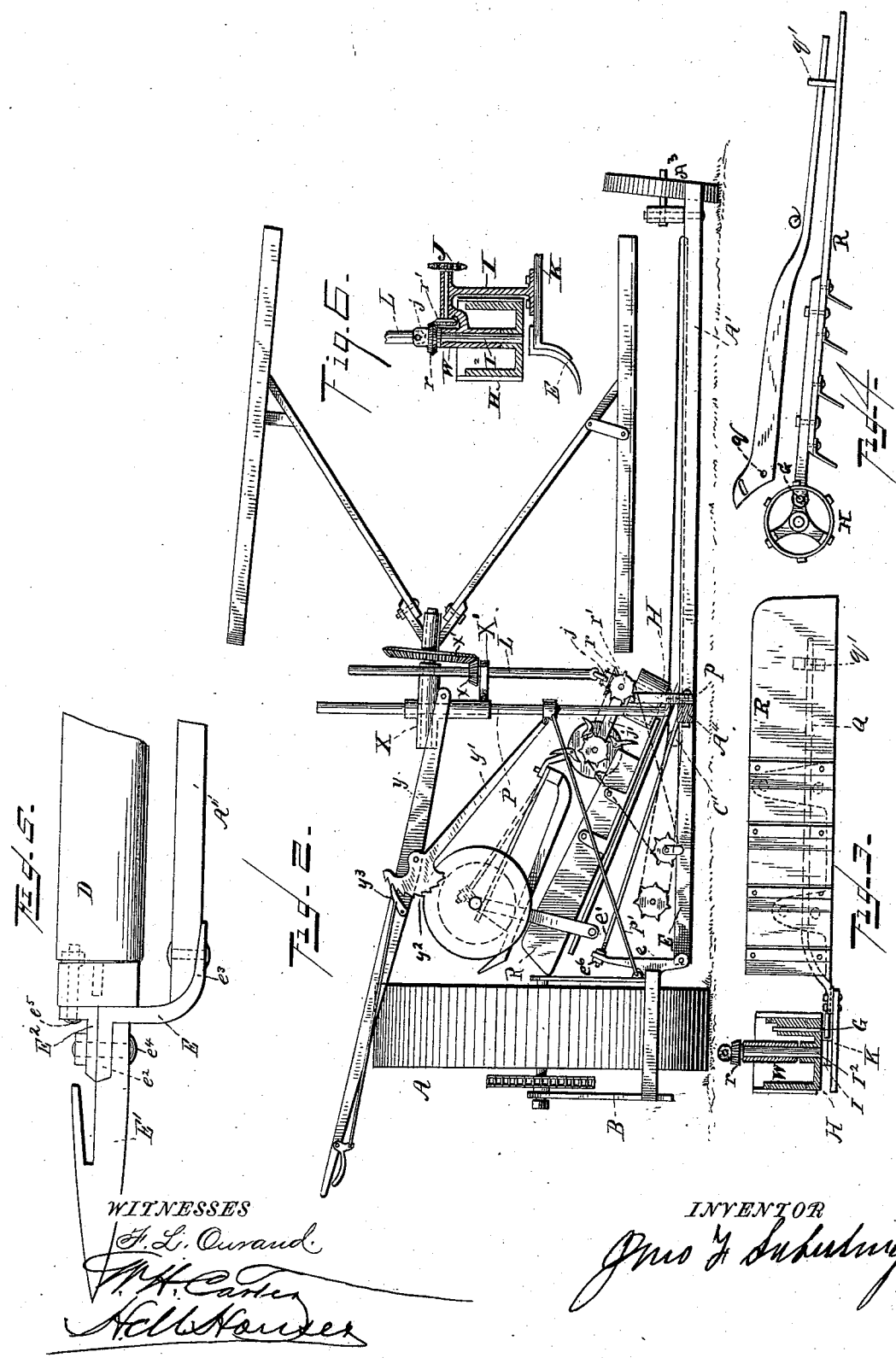
WITNESSES
INVENTOR

UNITED STATES PATENT OFFICE.

JOHN F. SEIBERLING, OF AKRON, OHIO.

HARVESTER AND BINDER.

SPECIFICATION forming part of Letters Patent No. 429,652, dated June 10, 1890.

Application filed November 26, 1888. Serial No. 291,918. (No model.)

*To all whom it may concern:*

Be it known that I, JOHN F. SEIBERLING, of Akron, in the county of Summit and State of Ohio, have invented certain new and useful Improvements in Harvesters and Binders, of which the following is a description, reference being had to the accompanying drawings, in which—

Figure 1 represents a plan view of my combined machine embodying my invention with the reel-driving shaft removed. Fig. 2 represents a front view of same. Fig. 3 represents an elevation of my butting device and its vibratory butting-rake. Fig. 4 is a plan view of same. Fig. 5 is a sectional view of my cutter-bar and its attachments. Fig. 6 is a sectional view of the butting device.

My invention consists of a number of parts, and also has reference to the novel manner in which said parts are arranged, producing desired results in a very simple form of machine.

The first part of my invention has reference to the arrangement of the frame and supporting-wheels, carrying-platform, and binder of that class of harvesting-machines in which an endless carrier-belt or series of carrier-belts move the grain as it falls thereon as it is cut by the knife in the advance of the machine through the standing grain. The grain is carried and delivered on the binder-platform, from which the bound bundles are discharged at the rear of the main drive-wheel.

The main difficulty experienced heretofore in harvesters arranged to deliver the bundles in the rear of the main wheel has been too much weight back of the main wheel by reason of the binder being located too far back of the axle, which necessitates moving the driver's seat on the extreme forward end of the main frame to counterbalance the weight of the binder, or the use of a caster-wheel in the rear to carry the weight, or means between the carrying-platform and binder to turn the grain rearwardly to escape the main wheel. Another difficulty was the location of the grain-wheel in the rear of the extended line of the main axle, which caused the grain-wheel to slide laterally on the ground in turning corners, making the machine difficult to operate and hard on the team, and also necessarily extending the platform farther back, making the machine much larger and more cumbersome to handle. To overcome these difficulties I arrange the finger-beam and grain-platform obliquely to the path of the main wheel, the outer end of the finger-beam being forward of the extended line of the main-wheel axle, so that the center of the grain-wheel shall be at or near said extended main-wheel-axle line, and the inner end of said beam being in rear of said axle and supported by a bracket connected to the main frame about midway between the main axle and the rear inner corner thereof, so that the line of travel of the butts of the grain will extend obliquely from the grain end of the platform rearwardly over the rear part of the main wheel and permit the bundles to be discharged back of the main wheel without the necessity of locating the binder back of the wheel or turning the grain rearward from the grain-carrying platform to escape said main wheel. The grain-carrying platform is arranged in rear of the finger-bar in any well-known form. Near the inner end of the finger-bar and platform, and near the inner side of the main wheel, I place the binder, which is sufficiently elevated to permit the butts of the bundles to be discharged from the inclined binder-table over the rear part and back of the main wheel. It is obvious that by the oblique arrangement of the finger-bar and the location of the binder on the inside of the main wheel I am enabled to place the binder much closer to the main axle and still preserve the proper distance of the binder from the rear part of the wheel to deliver the bundles than is possible to do in a machine having the finger-beam arranged at right angles to the wheel, as that part of the finger-beam and platform on which the binder is located is carried toward and close to the main axle by reason of its oblique direction, and therefore it requires less counter-weight on the opposite side of the axle to balance the machine. By this arrangement I also attain the location of the grain-wheel on the line at or near the extended line of the main axle, thus securing the natural travel of the wheel in turning and a perfect balance of the machine, also greater compactness, and the location of the driver at or near a position over the main axle.

I am enabled to dispense with elevating devices commonly used in two-wheel harvesters, as I obviate the necessity of elevating the grain to discharge over the drive-wheel, and by so doing decrease the amount of power required to operate the harvester, while the driver can readily control and guide the machine at the corners of the field of grain and tilt the platform to cut the lodged or fallen grain.

A represents the main drive-wheel of the machine, which is mounted in a rectangular frame B, to which the draft-pole is attached.

A' indicates the carrier-platform; E, the finger-bar; $A^3$, the grain-wheel, and V the divider. The carrier-platform A' is supported at its inner or delivery end upon the main drive-wheel frame B by means of a two-armed bracket $e$, to the lower arm of which the finger-bar E is secured, and to the upper arm of which one end of a brace-rod $e'$, attached at its other or lower end to the carrier-platform, is secured, as shown, by a nut $e^6$. Said rod $e'$ serves as a brace for supporting the platform A', and by adjusting the nut $e^6$ referred to sagging of the platform is prevented. The rear end or side of the platform A' is supported and held in place by a bracket or brace B', which is bolted to an arm $A^2$ of the platform and to the rear of the wheel-frame B. At or near the front of the wheel-frame B another bracket $B^2$ is bolted, in which the shaft $f$, which communicates motion to the carrier, is journaled, and another brace (indicated at $p'$) extends therefrom to the reel-post P, hereinafter referred to. By the above-described means the carrier-platform is connected with and supported by the main drive-wheel frame.

The carrier-platform is substantially rectangular in shape and composed of bars A' A' $A^2$ and the connecting transverse bar $A^4$, divider V, and braces $c'$ $c'$. The divider V is supported by the grain-wheel $A^3$, which is journaled on a crank-arm $A^5$, projecting laterally therefrom, as shown. Said divider supports and connects the front and rear bars A' of the platform.

C and D represent the endless belts of the carrier, which pass over pulleys on a shaft C' at the inner end of the platform and over pulleys on shafts $C^2$ and $C^3$ at the outer end of the same. The forward shaft $C^3$ is located at greater distance from shaft C' than shaft $C^2$. Therefore the belts D are necessarily longer than those C. The shafts $C^2$ and $C^3$ are journaled in bearing-plates $c$ $c$, secured to the inner adjacent faces of the bars A' of the platform-frame, and suitable diagonal braces $c'$ $c'$, interposed between the bars A', serve to greatly strengthen and stiffen the platform-frame.

My finger-bar E is constructed in one piece, as shown in Fig. 5, and is attached rigidly to the platform. It consists of the main upright or vertical part, a forwardly-projecting flange $e^2$, and the long curved lower edge $e^3$, and the bottom board of the platform being curved at the front end. This lower edge conforms to the shape of the lower side of the board, which is secured to it, as shown.

The guard-fingers (indicated at E') are attached to the under side of the forwardly-projecting flange $e^2$ of the finger-bar. Said guards are each bent or curved near their centers, as shown in Fig. 1, so that the forward portion or front end thereof will project in a line parallel with the line of advance of the machine, whereby the grain will be gathered in a line parallel to the advance of the cutter and the heads of the grain be thrown a little back toward the outer end of the platform as the butts of the grain are crowded in opposite direction by angular deflection of the guard-fingers from the inner side of the points of the finger-guards as the grain is cut and falls on the platform.

Power is communicated to my machine by the main drive-wheel A and its sprocket-wheel, which actuates the main gear-shaft. The bevel-gear thereon actuates the pinion on one end of the obliquely-arranged crank-shaft $f$, which is journaled in bracket $B^2$ and on the binder-frame and drives the cutter and the entire harvester and binder mechanism by means of a gear-wheel $f'$, secured to its other end under the binder-table, engaging a gear-wheel $f^2$ on the packer-shaft, also mounted on the binder-frame. This latter shaft drives the binder and also the platform-carrier by means of a sprocket-wheel $f^3$ thereon, from which a chain extends to and drives the sprocket-wheel on the roller of the platform-carrier, the same being located near the center of the roller of the carrier-platform.

The driver's seat D' is secured by means of a bracket $D^2$ on the outer side of the main frame in front of the main axle.

The draft-pole may be attached in any of the well-known ways and have the usual draft-rod attachments.

The binder-table is supported at its lower receiving end on the platform, its upper end being supported on the binder-actuating shaft, which is in turn supported by the gear-standard in the usual well-known manner. The frame on which the binder mechanism is mounted is located between the platform-carrier and the drive-wheel frame, and is supported by the latter and by the finger-bar E and bars A' of the platform-carrier frame.

The sheaf or bundle carrier S is located in rear of the main frame, and is supported by means of an arm or bar $s^2$, bolted at one end to the arm $A^2$ of the carrier-platform frame, and having at its other end an eye or bearing for the shaft of said bundle-carrier, the rear end of which is supported thereby, and the forward end journaled in the main drive-wheel frame B. It is operated by the driver's foot by means of a crank-shaft S', supported in bearings on the rear end of the main frame B. Said shaft S' has two crank-arms $s$ and $s'$, the one $s$ extending beneath and supporting the bundle-tray, and the one $s'$ connected by a rod or link $S^2$ with a pivoted foot-piece or lock $S^3$, whereby the driver may at any time drop the bundle-tray and deposit the bundles on the ground.

As above stated, my grain-platform is provided with endless carrier-belts having spurs projecting therefrom to engage the grain. I also provide a butting device, consisting of a hollow rotating drum or cylinder H, which is located at the heel of the finger-bar and attached thereto by means of a shoe K, which is bolted to the cutter-bar and has secured thereto an upright post I, extending at its top over the hollow open cylinder H, with a journal-bearing for the shaft J. Said post I has cast integral therewith a long journal-bearing W for the shaft $I^2$, secured to the bottom of the cylinder H and extending upward through said long journal-bearing. Said shaft $I^2$ is provided at the top with a bevel-pinion $r$, which serves also as a support for the cylinder H as it rests on the journal-bearing, and the above pinion is provided with the universal coupling-joint $j$, for attaching the reel-driving shaft L to the shaft $I^2$. An arm $j'$ is also cast integral with said post I and extends therefrom toward the binder-table, and serves as a journal-bearing and support over the binder-table for the shaft of the revolving picker-teeth, that aid to convey the grain to the binder.

R indicates a vibrating rake-arm, pivoted by means of a pin G, working in a perforation within the periphery of the cylinder or drum at the under side thereof, which prevents any entanglement or clogging of the grain as it is delivered at this point by the carrier aprons or belts, and is forced forward by the teeth or hooks of the rake as it vibrates on the binder-table into the binder. Said rake is provided with an adjustable guide-arm Q, pivoted at $q$ to the shoe that supports the upright post I, and made adjustable laterally by a bolt through the slot in the arm near the point $q$, which firmly holds the arm to the shoe and allows the arm to be adjusted laterally. The outer end of the arm passes through a sliding bracket $q'$, secured to the outer end of the rake R, by which the end of the latter is supported, and adjusted laterally on the binder-table to guide the butts of the grain any desired distance from the needle.

Over the binder-table I employ also a revolving gatherer, consisting of picker-teeth secured loosely to cam-disks, which are attached to a shaft at proper places to aid in gathering the grain from the platform-carrier to the binder-table in the usual manner.

My reel-slats or beaters are caused to gather the standing grain inwardly and approach the cutter-bar in a line parallel thereto. I have found it an advantage in operating the reel to place the reel-shaft at a less oblique angle to the line of progression than the finger-beam. The shaft so placed will be located at an acute angle to the finger-beam, and in an ordinary reel of equal diameter at both ends the reel-bats would have the same acute angle. To preserve a parallel position of the reel-bats to the finger-beam, I increase the diameter of the reel at the inner end to a sufficient extent to compensate for the angle of the reel-shaft to the finger-beam. By this arrangement the reel-bats will not only occupy a parallel position to the finger-beam, but the end of the reel will revolve nearly on a parallel line to the line of progression. This arrangement of the reel will insure a better reeling of the grain on the platform and lessen the liability of the outer end of the reel-bats coming in contact with the divider and standing grain. The reel-driving shaft L and its driving-pinion, which slides freely thereon, are supported by an arm extending from the bracket X, which is adjustably mounted on the reel-post P. This shaft L has a universal coupling-joint attachment to the shaft $I^2$ of the cylinder or rotary butting-drum H. This cylinder-shaft has a pinion $r$ thereon, which is actuated by a corresponding pinion $r'$ on the horizontal shaft J, to the outer end of which is secured a sprocket-wheel, which derives its motion from the sprocket-wheel $r^2$ of the continually-revolving driving-shaft $f$ and the drive-chain $r^3$.

The reel-post P is pivoted at its lower end on the platform-frame at $p$, and may be adjusted back and forth on said pivot by means of rods $p'$. Vertical adjustment of the reel is effected by means of a lever $y$, which engages the reel-bracket X at its outer end, and is fulcrumed on an arm or strut $y'$, supported at its lower end on the reel-post and provided at its upper end with a ratchet-plate $y^2$, with which a locking-pawl $y^3$ on the lever $y$ engages for holding the lever, and with it the reel, at any desired adjustment.

In the construction of my platform-carrier I use in connection with the finger-bar an angle-iron clip $E^2$, the horizontal portion of which is attached to the finger-bar by means of the guard-bolt $e^4$, while the upright portion has a bolt $e^5$, securing it to the front side of the frame of the carrier-apron.

My divider board or sill, to which the grain-guard is attached, is curved outward at the front end to gather the grain, while its side is in a line parallel to the line of travel of the machine, and its rear end is bent outward to permit the extension of the carrier-belts to cover or lessen the space caused by the angle produced by crossing the obliquely-arranged finger-beam and said sill, all as represented in Fig. 1.

My binder-platform is slightly inclined upwardly from the plane of the harvester carrier-platform, and is in a line parallel with the direction of the movement of the grain and the travel of the carrier-platform and in a direction oblique to the line of advance of the machine and in rear of the main drive-wheel axle, and as the cut grain falls on the carrier-platform as it is cut by the harvester-knife said cut grain is carried rearwardly and parallel to the finger-bar and delivered to the binder in a line at right angles to the cutter-bar, and the grain is bound and discharged in rear of the main wheel onto the bundle-carrier.

Having now described my invention, I claim as new—

1. The combination, with the main wheel and main-wheel frame, of the finger-beam arranged obliquely to said main wheel and to the line of progression, the outer end of said finger-beam projecting in advance of the extended line of the main-wheel axle and the inner end in rear thereof, said finger-beam being secured to and supported by the main frame at a point intermediate of the main-wheel axle and the rear inner corner of the main frame, the drive-shaft $f$, arranged on the inside of said main frame and obliquely thereto and at right angles to the said finger-beam, and the gear on the front inner corner of the frame for driving said shaft, substantially as described.

2. The combination, with the main wheel and main-wheel frame, of the finger-beam arranged obliquely to said main wheel and frame and to the line of progression, the outer end of said finger-beam projecting in advance of the extended line of the main-wheel axle and the inner end in rear thereof and being secured to and supported by the main frame at a point intermediate of the main-wheel-axle and the rear inner corner of the main frame, the drive-shaft $f$, arranged on the inside of said main frame and obliquely thereto and at right angles to the said finger-beam, the grain-platform in rear of said finger-beam, the inclined binder-table at the inner end of said platform, the binder on the upper end of said table and on the inner side of the main wheel, the binder drive-shaft $h$, and the gear between said drive-shaft $f$ and the binder-shaft, all for joint operation, substantially as described.

3. The combination of the main wheel, the main frame, the finger-beam, the latter arranged obliquely to said main frame and wheel and to the line of progression, the outer end of said beam projecting forward of the extended line of the main-wheel axle and secured to and supported by said main frame at a point intermediate of said main-wheel axle and the rear inner corner of the main frame, the drive-shaft $f$, arranged on the inside of said main frame and obliquely thereto and at right angles to the said finger-beam, the grain-platform on the rear of the finger-beam, the outside divider, and the grain-wheel, the latter arranged at or near the extended line of the main-wheel axle, substantially as described.

4. The combination of the main wheel, the main frame, and the finger-beam, the latter arranged obliquely and supported as described, the drive-shaft $f$, arranged on the inside of said main frame and obliquely thereto and at right angles to the finger-beam, the grain-platform on the rear of said finger-beam, the outside divider, the grain-wheel near the extended line of the main-wheel axle, the inclined binder-table at the inner end of said grain-platform, the binder on the upper end of said table and inside of the main wheel and sufficiently elevated to deliver the butts of the bound bundle over the rear part of the main wheel, a bundle-carrier in rear of the main wheel, the treadle, and connections between the treadle and bundle-carrier for operating the same, substantially as described.

5. The combination of the main supporting-wheel, the main frame B, and the double bracket $e$, the latter secured to the inside of the frame between the rear inner corner thereof and the main-wheel axle, the obliquely-arranged finger-beam secured at the inner end to the lower end of said bracket, and the brace $e'$, secured to the platform-frame at one end and adjustably connected to the upper end of the bracket at the other end for supporting and adjusting the platform, as shown and described.

6. The combination of the obliquely-arranged finger-beam, the reel-shaft arranged at an acute angle thereto, (the outer end being closer to the finger-beam than the inner end,) and the inclined reel-bats set at an angle to the reel-shaft and having a greater spread at their inner ends than at their outer ends to secure a parallel position of the reel-bats to the finger-beam and less obliqueness of the reel to the line of progression of the machine for delivering the grain squarely onto the platform, substantially as described.

7. The combination of the cylinder H, the vibrating rake-arm, the guide-arm therefor, and the cylinder-shaft suspended from above by a bracket W, supported on a shoe connected to the carrier-frame or cutter-bar and having a flexible connection on the upper end thereof for supporting the reel-driving shaft L, as shown and described.

8. The combination of the rotary butting-cylinder H, supported by a shoe or bearing-bracket secured to the finger-bar, the vibratory reciprocating butting device R, and the journal or crank-bearing G, located within the periphery of said cylinder, and its guiding and supporting finger Q, operating as shown and described.

9. The combination of the platform-carrier and cutter-bar arranged obliquely to the main drive-wheel and grain-wheel, the reel-post and reel having its gathering-arms or beaters arranged at an acute angle to the reel-shaft, as and for the purpose shown and described, and the lever $y$ and its supporting-arm $y'$, for adjusting the height of said reel, as specified.

10. The combination of the obliquely-arranged finger-beam and the platform attached thereto, the divider-sill, the rear end of which is bent outwardly to permit the carrier-belts to be extended to partially cover or diminish the space produced by the angle formed by the crossing of the finger-beam and sill.

JNO. F. SEIBERLING.

Witnesses:
W. H. CARTER,
H. M. HAUSER.